United States Patent
Kim et al.

(10) Patent No.: US 10,148,552 B2
(45) Date of Patent: *Dec. 4, 2018

(54) SHORTEST PATH SEARCH WITH CONSTRAINTS IN NETWORKS

(71) Applicant: Fujitsu Limited, Kawasaki-shi, Kanagawa (JP)

(72) Inventors: Inwoong Kim, Allen, TX (US); Xi Wang, Murphy, TX (US); Qiong Zhang, Plano, TX (US); Paparao Palacharla, Richardson, TX (US); Tadashi Ikeuchi, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 196 days.

This patent is subject to a terminal disclaimer.

(21) Appl. No.: 15/169,313

(22) Filed: May 31, 2016

(65) Prior Publication Data

US 2017/0346719 A1    Nov. 30, 2017

(51) Int. Cl.
*H04L 12/721* (2013.01)
*H04Q 11/00* (2006.01)

(52) U.S. Cl.
CPC ....... *H04L 45/124* (2013.01); *H04Q 11/0066* (2013.01); *H04L 45/62* (2013.01); *H04Q 2011/0073* (2013.01)

(58) Field of Classification Search
None
See application file for complete search history.

(56) References Cited

U.S. PATENT DOCUMENTS

| | | | | |
|---|---|---|---|---|
| 2010/0329120 | A1* | 12/2010 | Zhang | H04L 45/00 370/238 |
| 2012/0301143 | A1* | 11/2012 | Shimizu | H04J 14/0221 398/49 |
| 2013/0202299 | A1* | 8/2013 | Prakash | H04J 14/0257 398/51 |
| 2014/0099119 | A1* | 4/2014 | Wei | H04J 14/0257 398/79 |

* cited by examiner

*Primary Examiner* — Edan Orgad
*Assistant Examiner* — Saumit Shah
(74) *Attorney, Agent, or Firm* — Baker Botts L.L.P.

(57) ABSTRACT

Methods and systems are provided for determining a shortest path with a constraint in an optical network. The method includes identifying a permitted number of events defined by the constraint. The method further includes creating virtual nodes for each node in the optical network, the virtual nodes corresponding with the permitted number of events. The method also includes traversing the virtual nodes from a source node to a destination node with a shortest path algorithm, wherein traversing the virtual nodes comprises creating virtual links between the virtual nodes when the constraint is not violated, the virtual link corresponding with a physical link; and identifying a shortest path between the source node and the destination node from the virtual links, the shortest path not violating the constraint.

20 Claims, 13 Drawing Sheets

SHORTEST PATH SEARCH WITH CONSTRAINTS IN NETWORKS

BACKGROUND

Field of the Disclosure

The present disclosure relates generally to optical communication networks and, more particularly, to shortest path search with constraints.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, couplers, and other elements configured to perform various operations within the network.

Computation of an optical signal path through the various network nodes is a core function for design, modeling, management, and control of optical networks. Optical path computation may enable operators of an optical network to customize, control, and/or update network policies. One feature of optical path computation involves determination of end-to-end paths from a source node to a destination node. It may be desirable to select the shortest path between the source and destination node to, for example, reduce signal latency or cost. The shortest path may be measured by weights (e.g., distance or another factor) between the nodes.

However, paths in an optical network may vary by factors other than weight. For example, one path between the source and destination node may pass through more network nodes than another path with the same cumulative weight. A particular path may pass through more of a certain type of node or physical link. As another example, a particular path may also require processing, such as optical signal regeneration and/or recoloring. These factors may affect latency, resources, signal quality, and/or cost within the optical signal path. However, these factors may not be considered in the computation of the shortest path.

Thus, it may be desirable to add constraints during the path computation to limit particular events in signal paths. For example, it may desirable to limit the total number of network nodes in a signal path such that no path exceeds a predetermined maximum number of nodes (e.g., maximum number of hops in a path). As another example, it may be desirable to limit the number of a particular type of network nodes, links, and/or processing (e.g., regeneration and/or recoloring) in a path.

SUMMARY

In particular embodiments, a method for determining a shortest path with a constraint in an optical network includes identifying a permitted number of events defined by the constraint. The method further includes creating virtual nodes for each node in the optical network, the virtual nodes corresponding with the permitted number of events. The method also includes traversing the virtual nodes from a source node to a destination node with a shortest path algorithm, wherein traversing the virtual nodes comprises creating virtual links between the virtual nodes when the constraint is not violated, the virtual link corresponding with a physical link; and identifying a shortest path between the source node and the destination node from the virtual links, the shortest path not violating the constraint.

In another embodiment, a control system for identifying the shortest path with a constraint having access to memory media storing instructions executable by a processor to identify a permitted number of events defined by the constraint. The instructions are also executable to create virtual nodes for each node in the optical network, the virtual nodes corresponding with the permitted number of events. The instructions are further executable to traverse the virtual nodes from a source node to a destination node with a shortest path algorithm by creating virtual links between the virtual nodes when the constraint is not violated, the virtual link corresponding with a physical link and identifying a shortest path between the source node and the destination node from the virtual links, the shortest path not violating the constraint.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
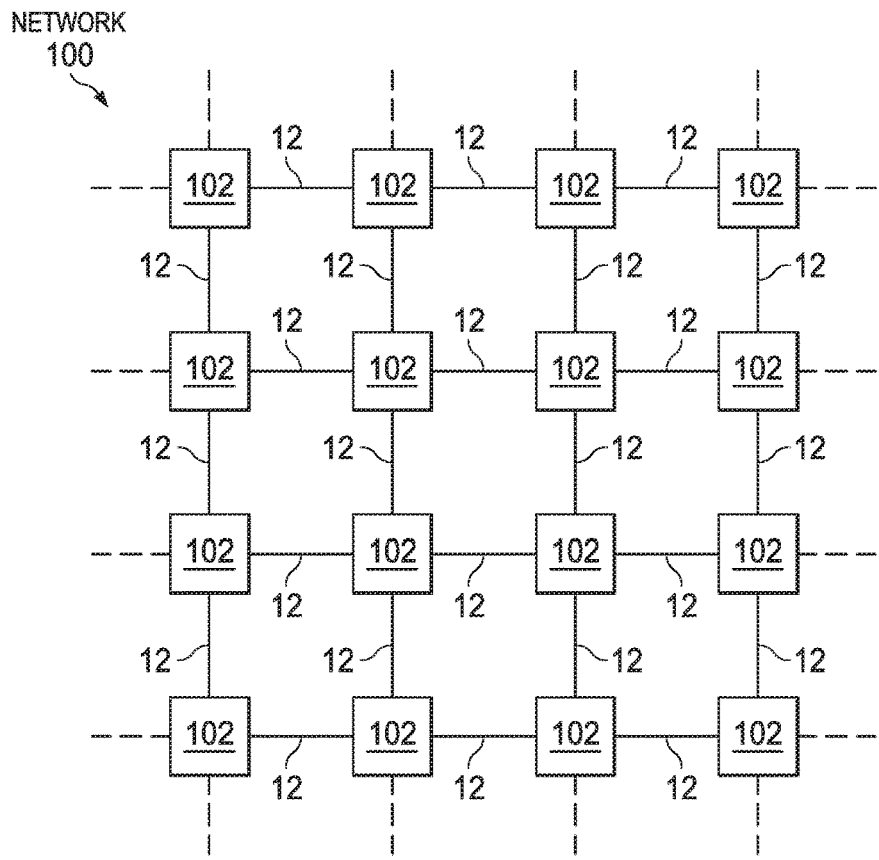
FIG. 1 is a block diagram of selected elements of an embodiment of a network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

A network is comprised of nodes (or network elements) communicatively coupled to each other. These nodes communicate information between each other over links (or transmission media). For example, a source node may send information to a destination node in the network through a path of nodes and links. However, there may be more than one network path by which to send such information. In some embodiments, a path computation engine may be used to identify links between nodes and to select the shortest path between the source and destination nodes. In addition to distance, however, it may be desirable to place a constraint on a network path to, for example, limit the number of occurrences of a particular event in the network path. As an example, it may be desirable to implement a constraint to limit the number of regenerations or recolorings in an optical network path in order to reduce signal degradation and ensure signal quality. In this manner, constraints may be used during path computation to improve signal quality, cost, network resources, or other aspects of the signal, path, or network.

Referring now to the drawings, FIG. 1 is a block diagram showing selected elements of an embodiment of network 100. In various embodiments, network 100 may be an Ethernet network. Network 100 includes one or more transmission media 12 operable to transport one or more signals communicated by components of network 100. The components of network 100, coupled together by transmission media 12, may include a plurality of network elements 102 (also referred to as a network node, or simply a node). In the illustrated network 100, each network element 102 is coupled to four other nodes. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network elements 102 to each other and communicate information between them. For example, a transmission medium 12 may include an optical fiber, an Ethernet cable, a T1 cable, a Wi-Fi or Bluetooth connection, and/or any other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, frames or packets.

Each network element 102 in network 100 may comprise any suitable system operable to transmit and receive network traffic. For example, network element 102 may be a hub, router, switch, bridge, or any other system or device operable to transmit and receive network traffic. In the illustrated embodiment, each network element 102 may be operable to transmit traffic directly to one or more other network elements 102 and receive traffic directly from one or more other network elements 102 via transmission media 12.

As referenced above, one or more components of network 100 may be optical network components. For example, some or all of network elements 102 may communicate via optical signals. Thus, some network elements 102 may include one or more optical transmitters, multiplexers, optical amplifiers, add/drop multiplexers, demultiplexers, and optical receivers. Optical network elements 102 may communicate over optical fibers that include thin strands of glass capable of communicating the signals over long distances with very low loss. These optical fibers may comprise a suitable type of fiber, including for example, Single-Mode Fiber (SMF), Enhanced Large Effective Area Fiber (E-LEAF), or True-Wave® Reduced Slope (TW-RS) fiber.

The optical elements in network 100 may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave or a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

Network 100 may include a management plane, a control plane, and a transport plane (sometimes called the physical layer). A central management host (not expressly shown in FIG. 1) may reside in the management plane and may configure and supervise the components of the control plane. The management plane may control transport plane and control plane entities (e.g., network elements 102 and network nodes 302 discussed below with respect to FIG. 3). As an example, the management plane may consist of a central processing center (e.g., the central management host), including one or more processing resources, data storage components, etc. The management plane may be communication with the elements of the control plane and may also be in communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

Figure 2:
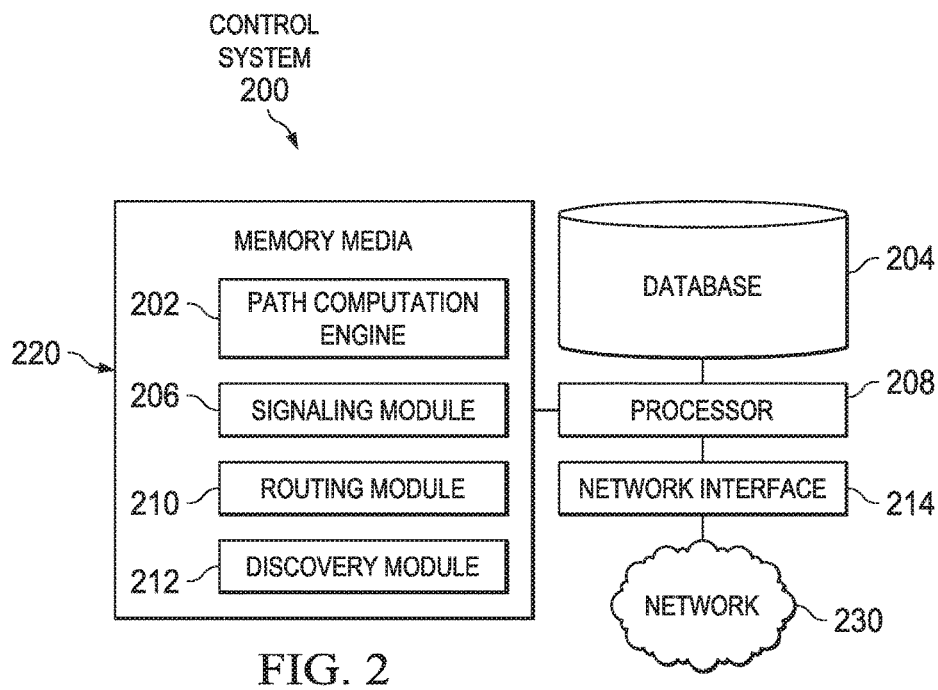
FIG. 2 is a block diagram of selected elements of an embodiment of a control system for an optical network.

FIG. 2 is a block diagram of selected elements of an embodiment of control system 200 for implementing control plane functionality in networks, such as, for example, in network 100 in FIG. 1 or network 300 in FIG. 3. An exemplary control system is Fujitsu Network Communications Inc.'s NETSMART® system. A control plane may include functionality for network intelligence and control and may comprise applications that support the ability to establish network services, including applications or modules for discovery, routing, path computation, and signaling, as will be described in further detail below. The control plane applications executed by control system 200 may work together to automatically establish services within the network, including for example, within the optical components of the network. Discovery module 212 may discover physical links connecting nodes (i.e., network elements) to neighbor nodes. Routing module 210 may broadcast physical link (e.g., transmission medium) information to network nodes while populating database 204. When a request for service from the network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (i.e., executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. As described herein, path computation engine 202, in conjunction with signaling module 206, discovery module 212, and routing module 210, may represent instructions or code for implementing various algorithms according to the present disclosure.

Also shown included with control system 200 in FIG. 2 is network interface 214, which may be a suitable system, apparatus, or device operable to serve as an interface between processor 208 and network 230. Network interface 214 may enable control system 200 to communicate over network 230 using a suitable transmission protocol or standard. In some embodiments, network interface 214 may be communicatively coupled via network 230 to a network storage resource. In some embodiments, network 230 may be an embodiment of at least certain portions of network 100. Network 230 may be implemented using hardware, software, or various combinations thereof.

In certain embodiments, control system 200 may be configured to interface with a person (i.e., a user) and receive data about the optical signal transmission path. For example, control system 200 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device or a network element, for example via network 230.

In some embodiments, discovery module 212 may be configured to receive data concerning an optical signal transmission path in an network and may be responsible for discovery of neighbor nodes and links between these nodes. In other words, discovery module 212 may send discovery messages according to a discovery protocol, and may receive data about the optical signal transmission path. In some embodiments, discovery module 212 may determine features of the nodes, links, number and type of components, data rate, and/or signal information (e.g., modulation format of the data, input power of the signal, number of signal carrying wavelengths, channel spacing, traffic demand, and network topology, among others).

Routing module 210 may be responsible for propagating link connectivity information to various nodes within a network, such as network 100 or network 300 discussed with respect to FIG. 3. In particular embodiments, routing module 210 may populate database 204 with resource information to support traffic engineering, which may include link bandwidth availability. Accordingly, database 204 may be populated by routing module 210 with information usable to determine a network topology of a network.

Path computation engine 202 may use the information provided by routing module 210 to database 204 to determine transmission characteristics of the optical signal transmission path, including the optical signal transmission path in the optical portions of the network. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as network 100 of FIG. 1 or network 300 of FIG. 3. For example, when an ingress node in the network receives a service request, control system 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation of control system 200, a feature of optical path computation may include the calculation of end-to-end reachable paths. A directly reachable path may represent a path between a source node and a destination node in a network for which an optical signal between the source node and the destination node may be transmitted without regeneration. By contrast, an indirectly reachable path between the source node and the destination node may involve regenerating the optical signal, using optical-electrical-optical (O-E-O), all-optical, or other suitable regenerators, before reaching the destination. In some instances, a path may require recoloring of the optical signal. Recoloring in optical networks refers to shifting wavelength channels to different wavelengths. Because of spectral slot fragmentation, network resource utilization in optical networks may be limited without the use of recoloring. Recoloring may be accomplished by O-E-O regenerators or with optical elements having a lower optical signal-to-noise ratio (OSNR) penalty and more operational flexibility than an O-E-O regenerator. Thus, an indirect end-to-end reachable path from a source node to a destination node may include one or more of a regenerator node and/or recoloring node.

Path computation engine 202 may determine the shortest end-to-end reachable paths. For example, path computation engine 202 may select the path from a source node to a destination node with the minimum combined weight between network nodes. Each physical link coupling network nodes may have a weight representing one or more factors, including distance, cost, delay, noise, transmission characteristics, and/or a combination thereof. Path computation engine 202 may use a shortest path algorithm to determine the shortest path between any two nodes. Examples of shortest path algorithms include but are not limited to Dijkstra's algorithm, the Bellman-Ford algorithm, Gabow's algorithm, and Thorup's algorithm.

However, as stated above, there may be factors other than weights of physical links that affect performance of an optical path or the network in which the path is located. For example, each path may traverse a number of network nodes, a number of a particular type of node, or a number of a particular type of physical links to reach the destination node. In addition, a path may require a particular type of processing, such as optical signal regeneration and/or recoloring. Any of these factors may affect signal quality, cost, network resources, or other aspects of the optical path or network and therefore may need to be accounted for in path computation.

In some embodiments, a network administrator may impose one or more constraints on path computation engine 202 to limit the number of occurrences of a particular event. A constraint may limit, for example, the number of network nodes in a path such that the shortest path may not exceed a predetermined maximum number of nodes. As another example, a constraint may limit the number of a particular type of network nodes, links, and/or processing (e.g., regeneration and/or recoloring) permitted in any path. Path computation engine 202 may account for such constraints in computing the shortest path between a source and destination node so that the shortest path complies with the constraint. Path computation engine 202 may disregard paths that do not comply with the constraint.

FIGS. 3A-3L are block diagrams of selected elements of an embodiment of an optical network at various stages of optical path computation with a constraint.

As shown, network 300 includes nodes 302-1 through 302-6, collectively referred to as nodes 302. During operation, a particular node 302 may communicate messages with other nodes 302 and/or other components of optical network 300 by optical signals propagating on physical links 304 at an appropriate wavelength. The optical signals may use or contain any of the techniques discussed above with respect to FIG. 1, including for example, modulation or multiplexing. Nodes 302 may communicate both data (e.g., files or webpages) and signaling (e.g., control messages, routing messages, and link management messages) using physical links 304. Data and signaling may be referred to collectively as messages or traffic.

Nodes 302 may include any suitable system operable to transmit and receive messages. For example, nodes 302 may include an OADM, a cross connect, a regenerating unit, an access gateway, an endpoint, a softswitch server, a trunk gateway, an access service provider, an Internet service provider, hub, router, switch, bridge, or any other device operable to route data to, from or within network 300.

Physical links 304 may include any suitable medium for transporting communications between nodes 302. For example, physical links 304 may comprise an optical fiber, such as those discussed above with respect to transmission medium 12 in FIG. 1.

Assume that node 302-1 needs to send a message to node 302-4. In such a scenario, node 302-1 is the source node and node 302-4 is the destination node for this particular transmission. As illustrated by the exemplary network topology in FIG. 3, more than one path may be used to route the message from the source node to the destination node. Possible paths include between nodes 302-1→302-2→302-3→302-4, between nodes 302-1→302-2→302-6→302-4, between nodes 302-1→302-5→302-6→302-4, and between nodes 302-1→302-5→302-3→302-4.

To select the appropriate path from node 302-1 to node 302-4, network 300 may contain or communicably couple to a system for path identification and/or selection. For example, network 300 may include a control system, similar to that described above with respect to FIG. 2. The control system may analyze and select end-to-end paths between various nodes 302 of network 300 using a discovery module, routing module, signaling module, and/or path computation engine.

One consideration in selecting the path may be the weights associated with physical links 304 coupling nodes 302. In network 300, each physical link 304 has an assigned weight. The weight may represent distance, cost, delay, noise, and/or a combination thereof for the particular link. For example, the link coupling nodes 302-1 and 302-2 has a weight of 3, the link coupling 302-2 to 302-3 has a weight of 1; the link coupling 302-3 to 302-4 has a weight of 4, the link coupling 302-2 to 302-6 has a weight of 3, the link coupling 302-1 to 302-5 has a weight of 2, the link coupling 302-5 to 302-6 has a weight of 1, the link coupling 302-5 to 302-3 has a weight of 3, and the link coupling 302-6 to 302-4 has a weight of 1.

Network 300 may use a shortest path algorithm, including those enumerated above, to identify the shortest path between nodes 302 using the weights of physical links 304 in network 300. The shortest path may represent the path with the lowest combined weight of physical links 304 in the path. For example, the shortest path from source node 302-1 to destination node 302-4 is between nodes 302-1→302-5→302-6→302-4 (illustrated by shortest path 310), representing a combined weight of 4 (e.g., 2+1+1).

In some embodiments, however, network 300 may have one or more constraints for network paths. A constraint may limit the number of events in a particular path. For example, a constraint may limit the number of network nodes, the number of a particular type of network nodes, the number of a particular type of physical links, and/or the number of occurrences of a particular type of processing (e.g., regeneration and/or recoloring) that occurs in a path.

To illustrate, network 300 may have a constraint limiting the number of a particular type of physical links 304 permitted in any path in network 300, which are identified in FIG. 3 as dashed links. A dashed physical link may correspond with a type of processing that occurs in a node associated with the link (e.g., regeneration and/or recoloring), passing through a particular type of network node, passing a particular type of physical link, the occurrence of polarization dependent loss, or another factor. The constraint may, for example, limit all paths to passing through one such dashed physical link 304 (e.g., the event in this example). Shortest path 310 (e.g., the path between nodes 302-1→302-5→302-6→302-4) violates this constraint because it passes through two dashed physical links 304 (e.g., once between nodes 302-1→302-5 and again from 302-5→302-6). Thus, shortest path 310 may not comply with the exemplary constraint despite being the shortest path between the source and destination node.

Figure 3A:
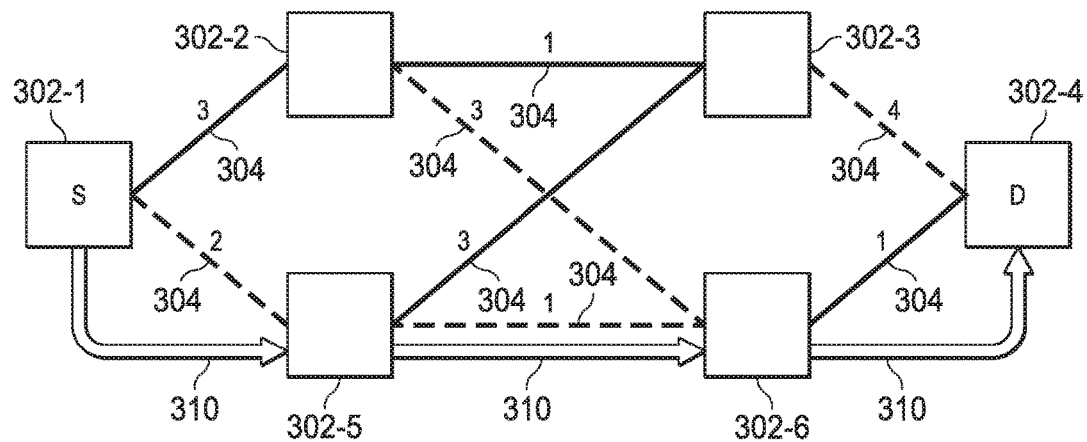
FIGS. 3A-3L are block diagrams of selected elements of an embodiment of an optical network at various stages of optical path computation with a constraint.
Figure 3B:
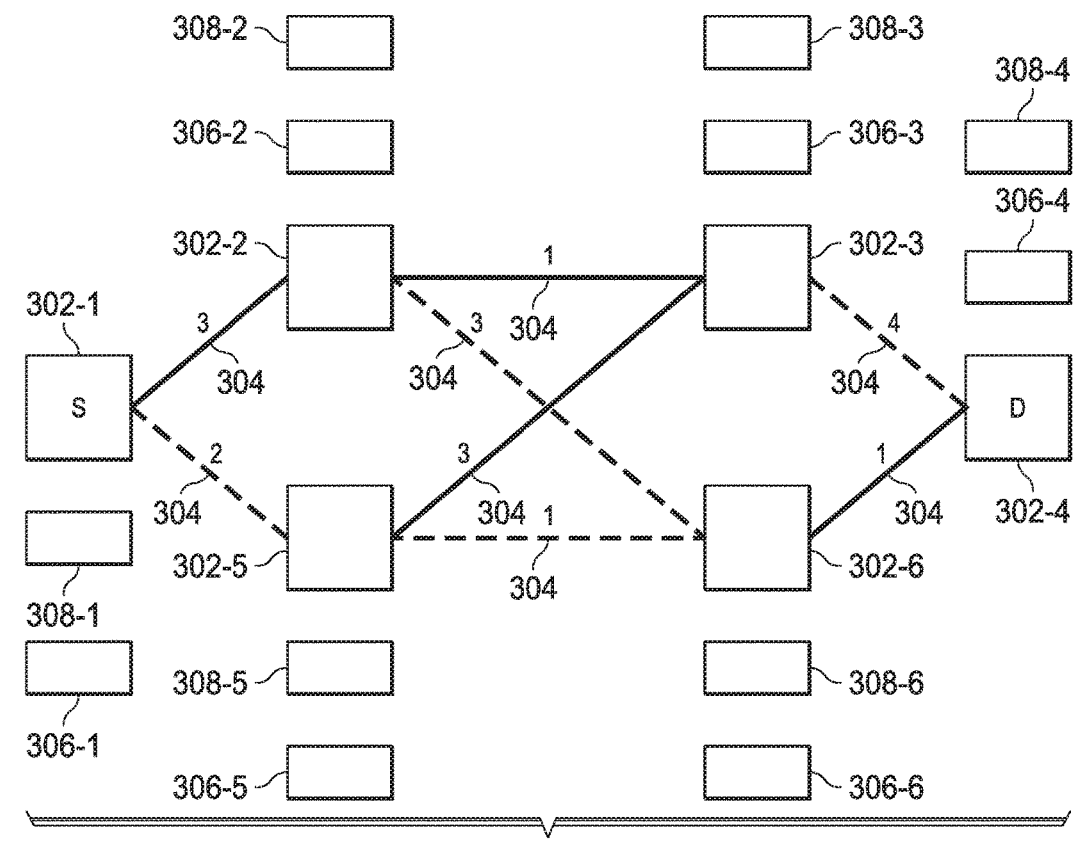

Network 300 may use one or more virtual nodes to account for the constraint. FIG. 3B is a block diagram of selected elements of an embodiment of network 300 with virtual nodes. One or more virtual nodes may be added to each node 302. A virtual node may correspond with a number of occurrences of an event in a constraint. For the exemplary constraint (i.e., any path in network 300 may not exceed one dashed physical link 304), two virtual nodes may be created for each node 302. One virtual node (e.g., virtual node 306) may correspond with zero occurrences of the event and the other (e.g., virtual node 308) may correspond with one occurrence of the event. Each node 302 may have corresponding virtual nodes 306 and 308.

The shortest path algorithm may run on the virtual nodes to calculate the shortest path with the constraint. As the virtual nodes are traversed using the physical links, virtual links may be created between the virtual nodes if the number of events does not exceed the permitted maximum. For example, a virtual node 306 (e.g., a virtual node corresponding with zero occurrences of the event) may link to a virtual node of a neighboring node 302 corresponding with zero or one occurrences. If an event does not exist or occur between nodes 302 corresponding to the virtual nodes, then the particular virtual node 306 may link to the neighboring virtual node 306 corresponding with zero occurrences of the event. If an event exists or occurs between nodes 302 corresponding to the virtual nodes, then the particular virtual node 306 may link to the neighboring virtual node 308 corresponding with one occurrence of the event. Similarly, a virtual node 308 (e.g., a virtual node corresponding with one occurrence of an event) may link to a neighboring virtual node corresponding with one occurrence. If an event does not exist or occur between nodes 302 corresponding to the virtual nodes, then the particular virtual node 308 may link to a neighboring virtual node 308. If, however, an event exists or occurs between nodes 302 corresponding to the virtual nodes, then the particular virtual node 308 is not permitted to couple to the virtual nodes of the neighboring node 302. That is, the path from the particular virtual node 308 to the neighboring virtual nodes is blocked because the maximum permitted number of events will be exceeded (i.e., the constraint violated).

In computing the shortest path, any virtual link formed between two virtual nodes has a weight equivalent to the particular physical link 304 coupling the corresponding nodes 302. For example, a virtual link between a virtual node of node 302-1 and a virtual node of node 302-2 has the same weight as physical link 304 (i.e., 3) coupling these two nodes.

Calculating the shortest path with a constraint using virtual nodes is illustrated in FIGS. 3B-L. To begin, the combined weight at each virtual node 306 and virtual node 308 may be initialized to infinity or another value (e.g., undefined value) representing that the virtual node has not been traversed in determining the shortest path between source node 302-1 and destination node 302-4. The combined weight of virtual node 306-1 may be set to 0 because there is no distance from source node 302-1 to itself.

Figure 3C:
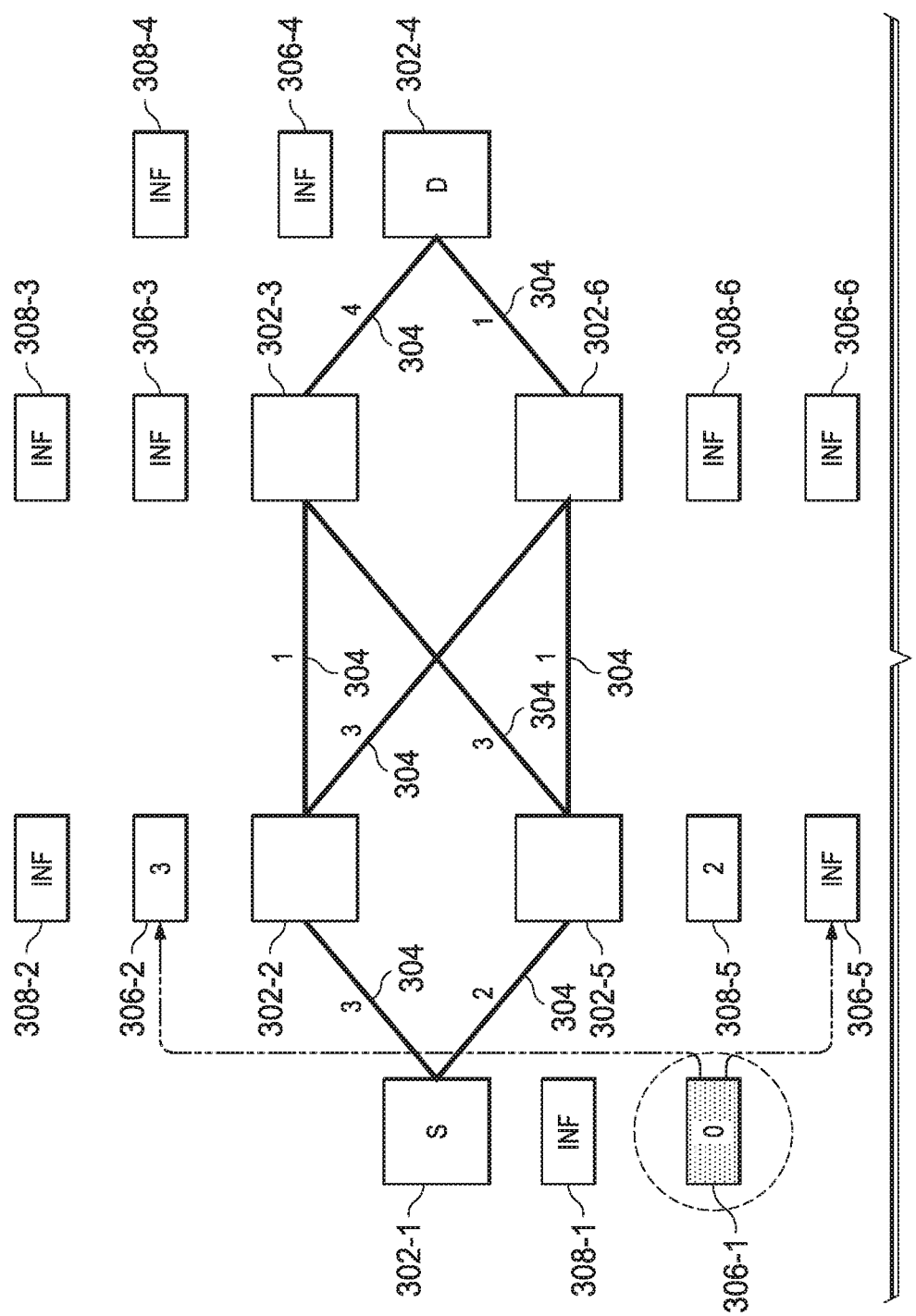

Traversal of network 300 may begin at virtual node 306-1, the virtual node corresponding with source node 302-1 and zero occurrences of the event. In FIG. 3C, candidate virtual links from virtual node 306-1 are considered with neighboring virtual nodes. For example, a link from virtual node 306-1 to virtual node 306-2 (e.g., a virtual node corresponding with no occurrences of the event) is possible because a dashed physical link was not crossed from virtual node 306-1 to virtual node 306-2. However, before a link is formed, a comparison may be made between the existing combined weight at the virtual node and the combined weight using the candidate link. If the combined weight with the candidate link is less than the existing combined weight at the virtual node, then the virtual link may be formed between the virtual nodes. For example, the virtual link may be formed between virtual node 306-1 and virtual node 306-2 because the combined weight of 3 is less than infinity, the current combined weight at virtual node 306-2. The combined weight at virtual node 306-1 may be set to 3, reflecting the weight of physical link 304 coupling node 302-1 to node 302-2. A link is also formed between virtual node 306-1 and 308-5 (e.g., the virtual node corresponding with one occurrence of the event) because a dashed physical link was crossed in traversing from node 306-1 to node 308-5 and because the combined weight 2 is less than infinity, the current combined weight at virtual node 308-5. The distance at 308-5 may be set to 2, reflecting the weight of physical link 304 coupling node 302-1 to node 302-5. After virtual nodes of neighbor nodes 302 have been considered, node 302-1 may be marked as visited such that other virtual nodes may not link to virtual nodes 306-1 and 308-1.

Figure 3D:
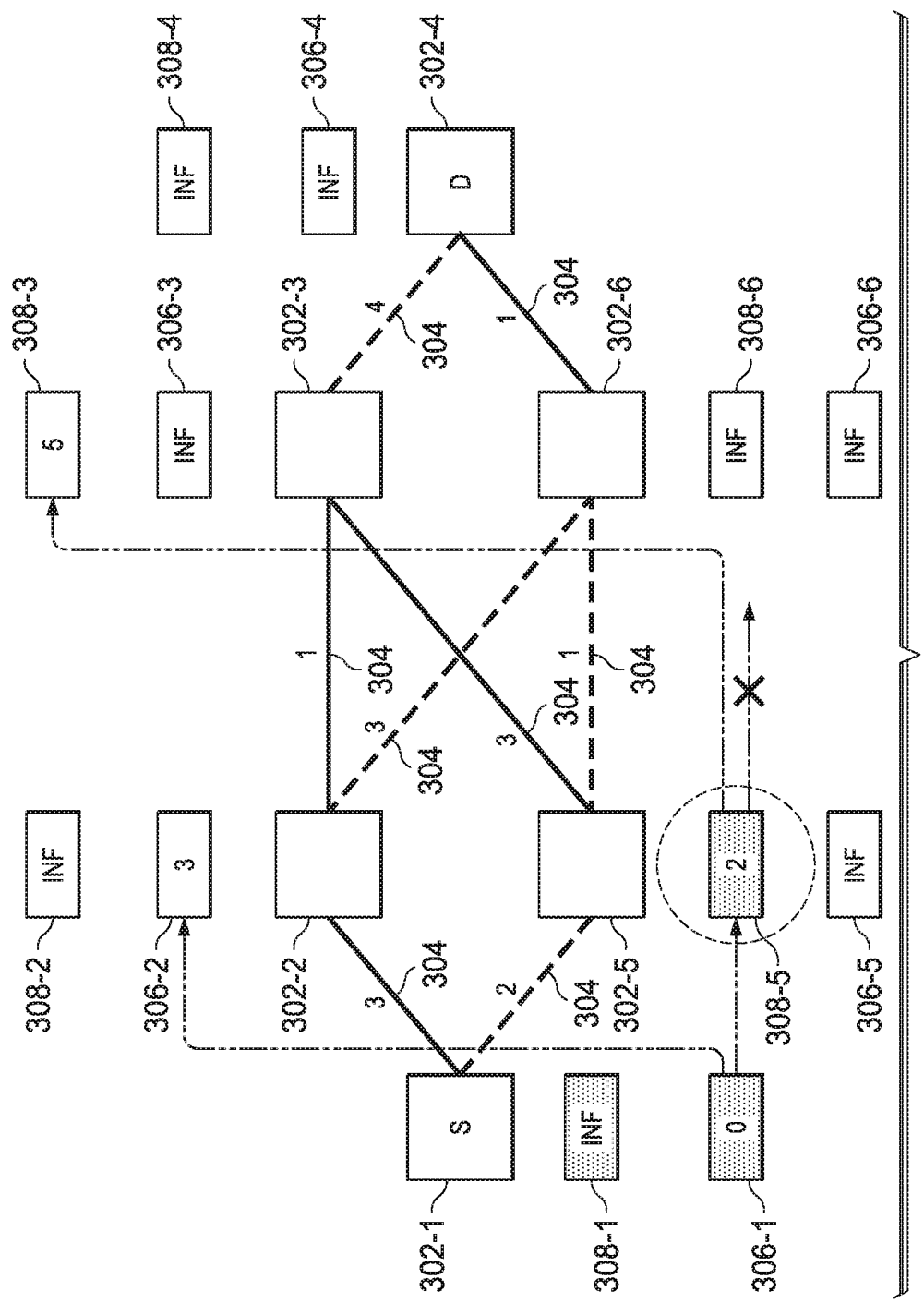

Virtual node 308-5 may be considered next because it has the smallest combined weight of the virtual nodes that have not been visited. In FIG. 3D, candidate virtual links from virtual node 308-5 are considered with neighboring virtual nodes. For example, a link from virtual node 308-5 is formed with virtual node 308-3 because no dashed physical link was crossed in traversing from node 308-5 to node 308-3 and the combined weight 5 (e.g., 2+3) is less than infinity, the current combined weight at virtual node 308-3. The combined weight at 308-3 may be set to 5, reflecting the combined weight of physical links 304 coupling nodes 302-1, 302-5, and 302-3. A link between virtual node 308-5 and virtual nodes of neighboring node 302-6 may be blocked because a second dashed physical link must be crossed (e.g., a violation of the constraint a path may have up to one dashed physical link) in traversing from node 302-5 to node 302-6. After virtual nodes of neighbor nodes 302 have been considered, virtual node 306-5 may be marked as visited such that other virtual nodes may not link to it.

Figure 3E:
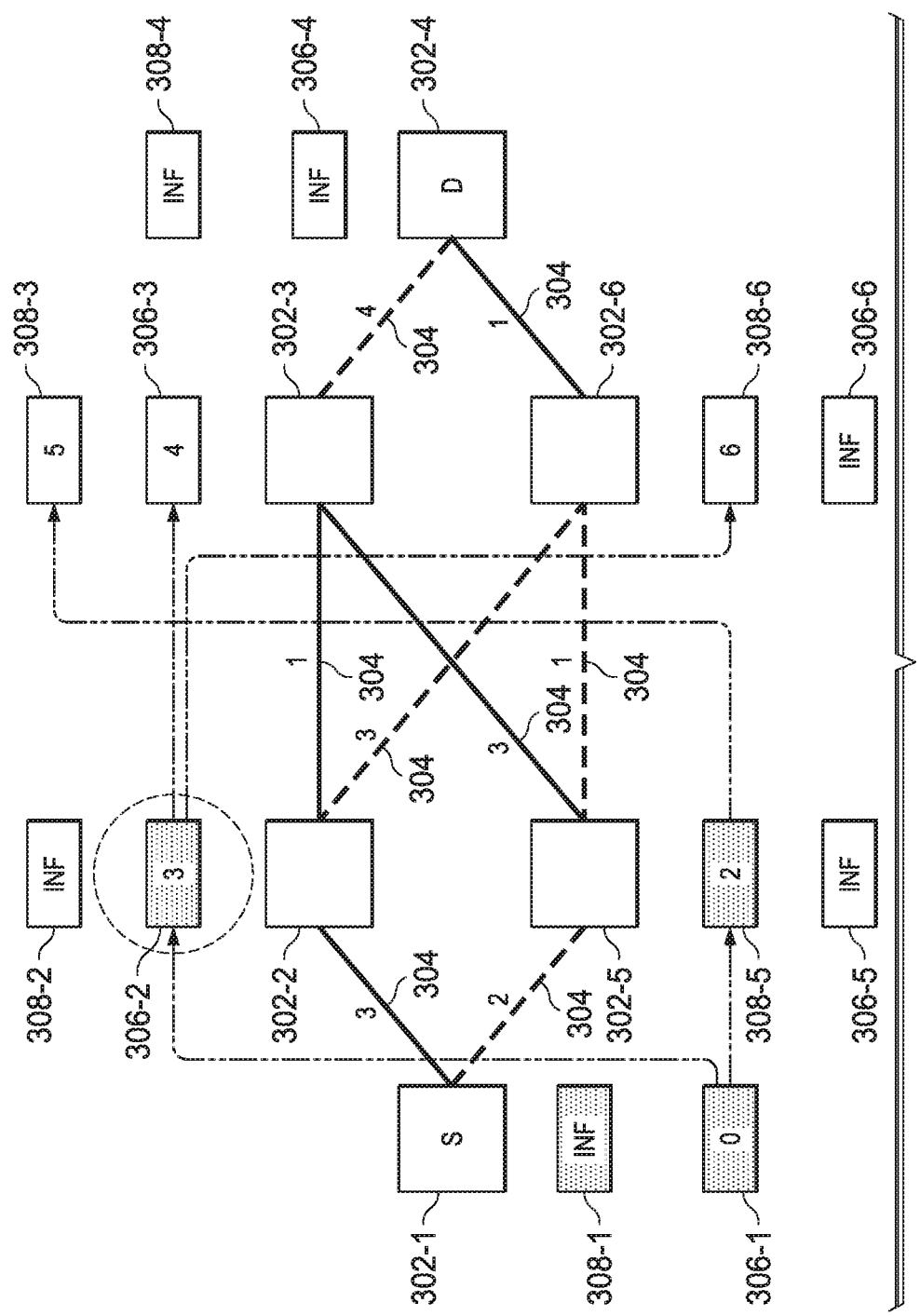

Virtual node 306-2 may be considered next because it has the shortest distance of the virtual nodes that have not been visited. In FIG. 3E, candidate virtual links from virtual node 306-2 are considered with neighboring virtual nodes. For example, a link from virtual node 306-2 is formed with virtual node 306-3 because no dashed physical link was crossed in traversing from node 306-2 to node 306-3 and the combined weight 4 (e.g., 3+1) is less than infinity, the current combined weight at virtual node 306-3. The combined weight at 306-3 may be set to 4, reflecting the combined weight of physical links 304 coupling nodes 302-1, 302-2, and 302-3. A link is also formed between virtual node 306-2 and 308-6 because a dashed physical link was crossed in traversing from node 306-2 to node 308-6 and because the combined weight 6 (e.g., 3+3) is less than infinity, the current combined weight at virtual node 308-6. The combined weight at 308-6 may be set to 6, reflecting the combined weight of physical links 304 coupling nodes 302-1, 302-2, and 302-6. After virtual nodes of neighbor nodes 302 have been considered, virtual node 306-2 may be marked as visited such that other virtual nodes may not link to it.

Figure 3F:
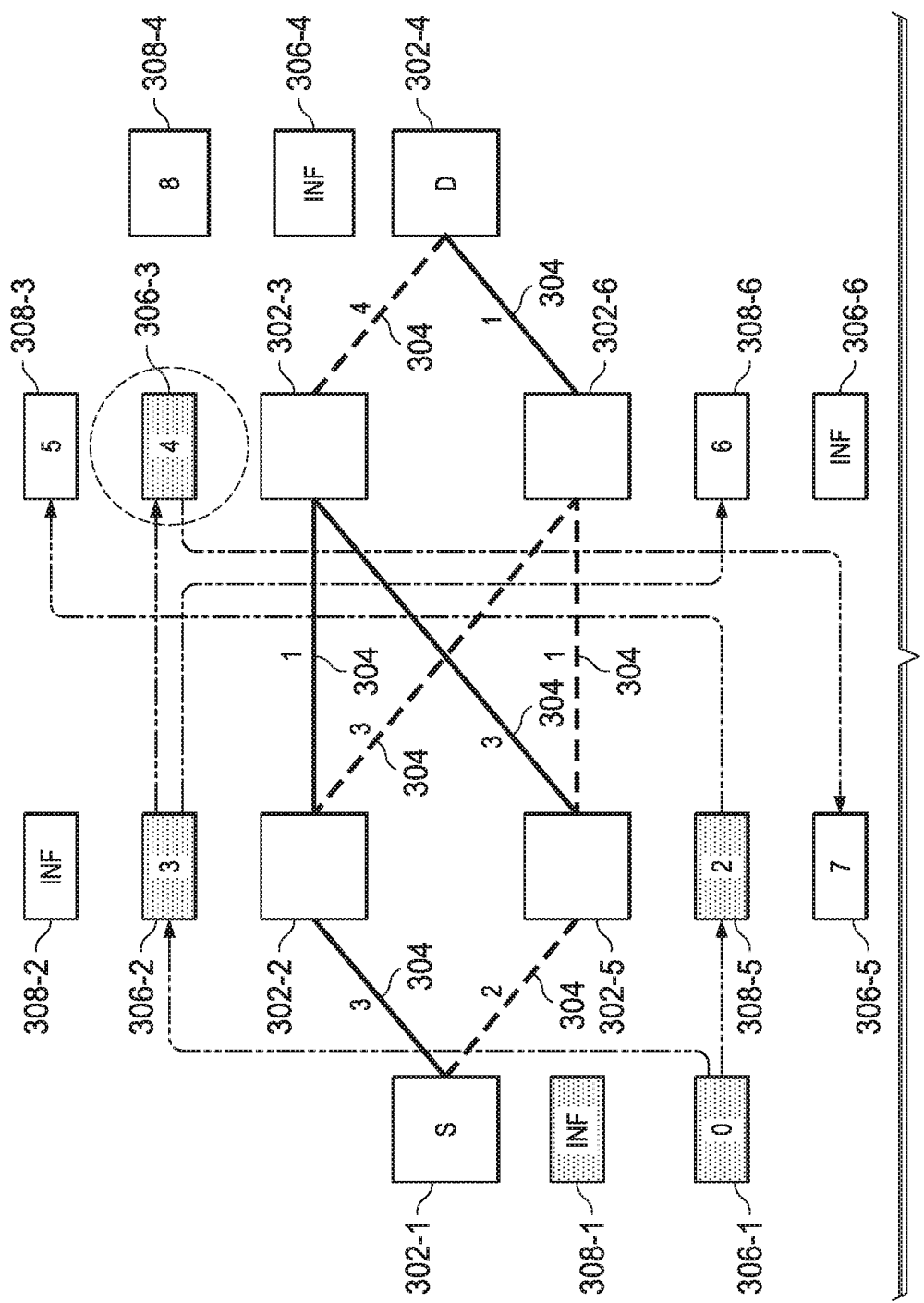

Virtual node 306-3 may be considered next because it has the shortest distance of the virtual nodes that have not been visited. In FIG. 3F, candidate virtual links from virtual node 306-3 are considered with neighboring virtual nodes. For example, a link from virtual node 306-3 is formed with virtual node 306-5 because no dashed physical link was crossed in traversing from node 306-3 to node 306-5 and the combined weight 7 (e.g., 3+1+3) is less than infinity, the current combined weight at virtual node 306-5. The distance at 306-5 may be set to 7, reflecting the combined weight of physical links 304 coupling nodes 302-1, 302-2, 302-3, and 302-5. A link is also formed between virtual node 306-3 and 308-4 because a dashed physical link was crossed in traversing from node 306-3 to node 308-4 and because the combined weight 8 (e.g., 3+1+4) is less than infinity, the current combined weight at virtual node 308-4. The combined weight at 308-6 may be set to 6, reflecting the combined weight of physical links 304 coupling nodes 302-1, 302-2, and 302-6. After virtual nodes of neighbor nodes 302 have been considered, virtual node 306-3 may be marked as visited such that other virtual nodes may not link to it.

Figure 3G:
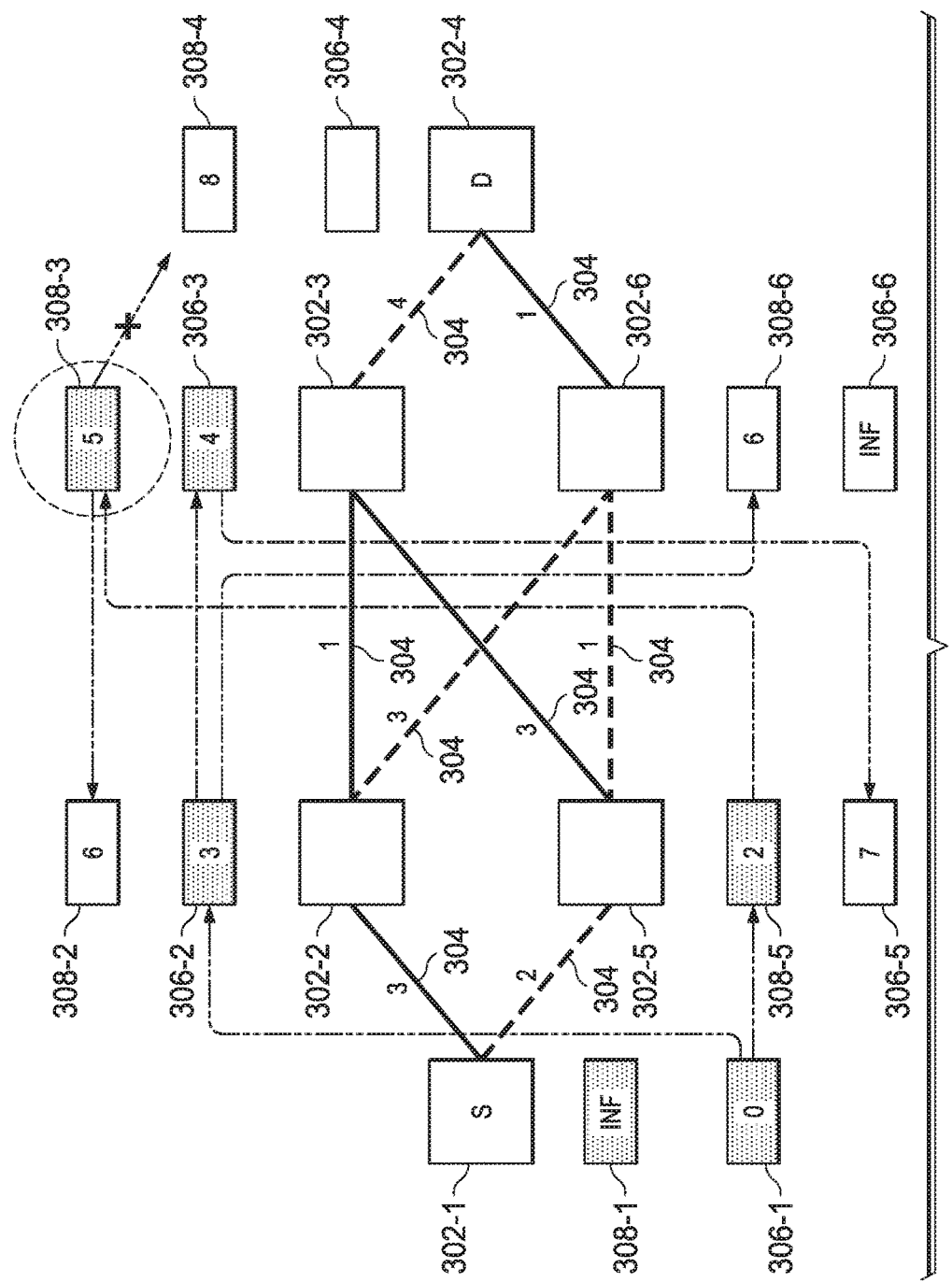

Virtual node 308-3 may be considered next because it has the smallest combined weight of the virtual nodes that have not been visited. In FIG. 3G, candidate virtual links from virtual node 308-3 are considered with neighboring virtual nodes. For example, a link from virtual node 308-3 is formed with virtual node 308-2 because no dashed physical link was crossed in traversing from node 308-3 to node 308-2 and the combined weight 6 (e.g., 2+3+1) is less than infinity, the current combined weight at virtual node 308-2. The combined weight at 308-2 may be set to 6, reflecting the weight of physical links 304 coupling nodes 302-1, 302-5, 302-3, and 302-2. A link between virtual node 308-3 and virtual nodes of neighboring node 302-4 may be blocked because a second dashed physical link must be crossed (e.g., a violation of the constraint a path may have up to one dashed physical link) in traversing from node 302-3 to node 302-4. After virtual nodes of neighbor nodes 302 have been considered, virtual node 308-3 may be marked as visited such that other virtual nodes may not link to it. In some embodiments, virtual node 308-3 may be skipped (e.g., no analysis of neighboring virtual nodes or creating of virtual links) because virtual node 306-3 has a lower combined weight (e.g., 4<5) and virtual node 306-3 represents fewer occurrences of the event (e.g., 0<1). Thus, a path through virtual node 308-3 could not be shorter than a path through 306-3, and the path computation may skip virtual node 308-3 to save time and resources.

Figure 3H:
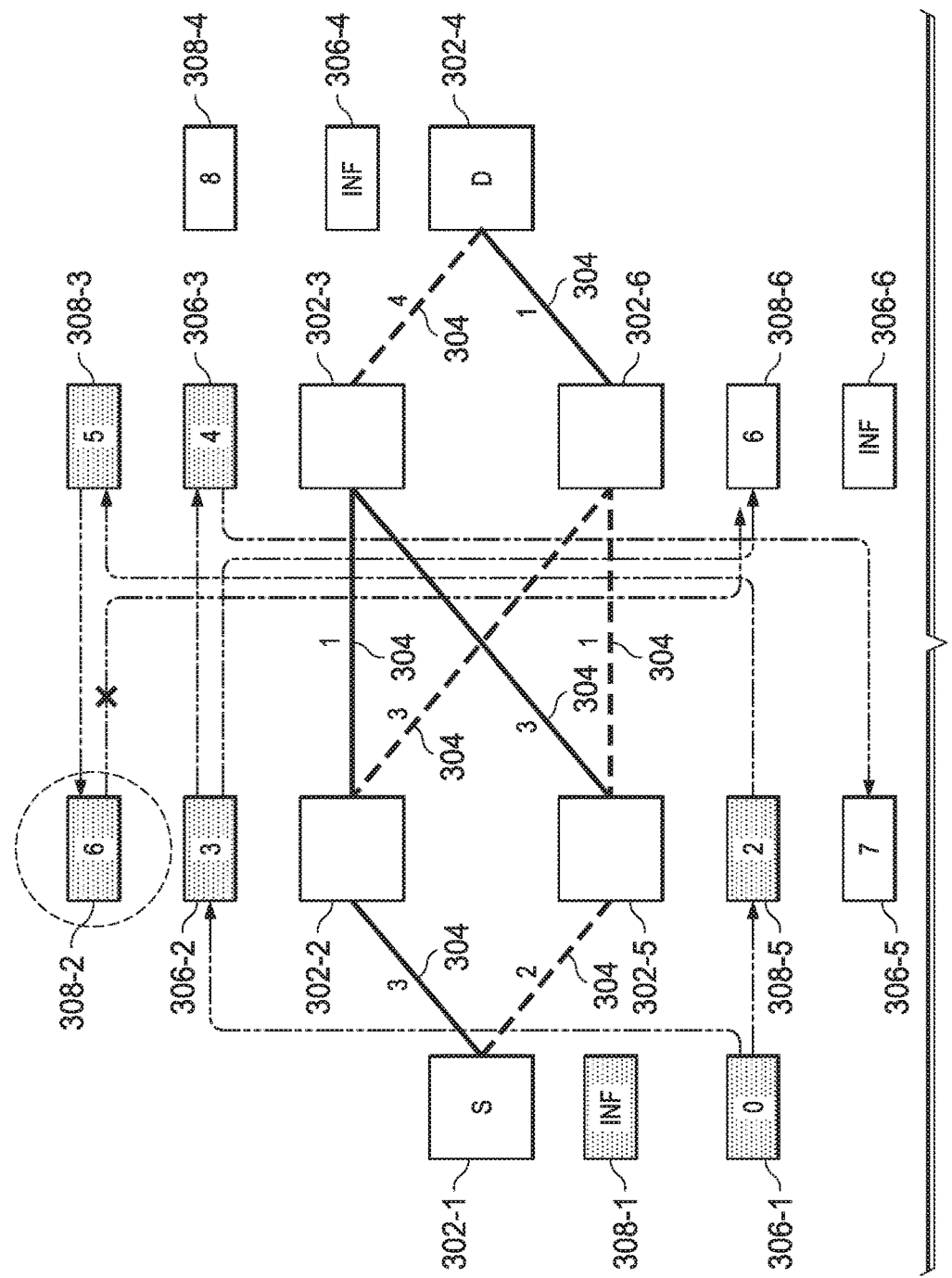

Virtual node 308-2 may be considered next because it is tied for the smallest combined weight of the virtual nodes that have not been visited. In FIG. 3H, candidate virtual links from virtual node 308-2 are considered with neighboring virtual nodes. A link between virtual node 308-2 and virtual nodes of neighboring node 302-6 may be blocked because a second dashed physical link must be crossed (e.g., a violation of the constraint a path may have up to one dashed physical link) in traversing from node 302-2 to node 302-6. After virtual nodes of neighbor nodes 302 have been considered, virtual node 306-5 may be marked as visited such that other virtual nodes may not link to it.

Figure 3I:
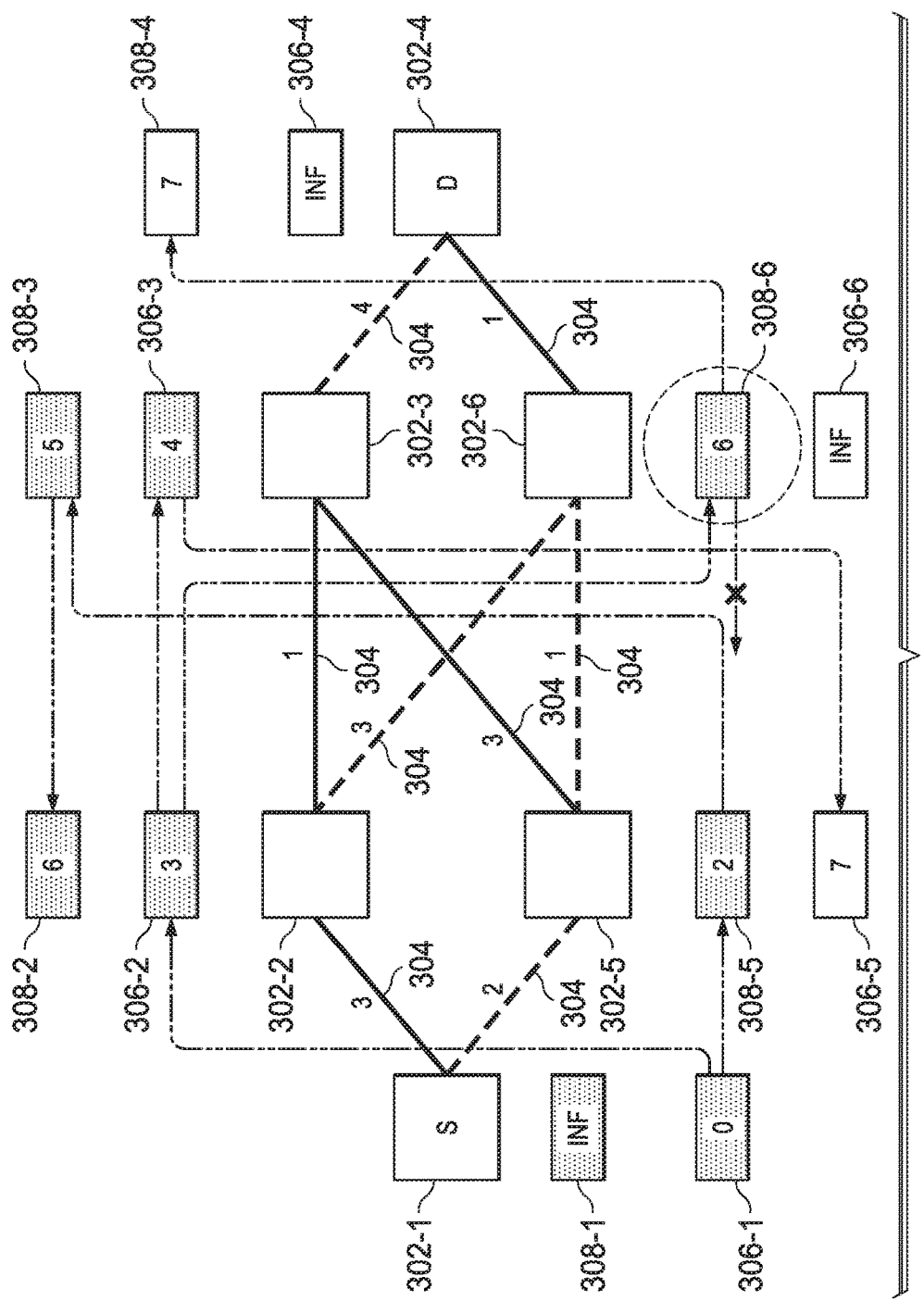

Virtual node 308-6 may be considered next because it has the smallest combined weight of the virtual nodes that have not been visited. In FIG. 3I, candidate virtual links from virtual node 308-3 are considered with neighboring virtual nodes. For example, a link from virtual node 308-6 is formed with virtual node 308-4 because no dashed physical link was crossed in traversing from node 308-6 to node 308-4 and the combined weight 7 (e.g., 3+3+1) is less than 8, the current combined weight at virtual node 308-4. The combined weight at 308-4 may be set to 7, reflecting the combined weight of physical links 304 coupling nodes 302-1, 302-2, 302-6, and 302-4. A link between virtual node 308-6 and virtual nodes of neighboring node 302-5 may be blocked because a second dashed physical link must be crossed (e.g., a violation of the constraint a path may have up to one dashed physical link) in traversing from node 302-6 to node 302-5. After virtual nodes of neighbor nodes 302 have been considered, virtual node 308-6 may be marked as visited such that other virtual nodes may not link to it.

Figure 3J:
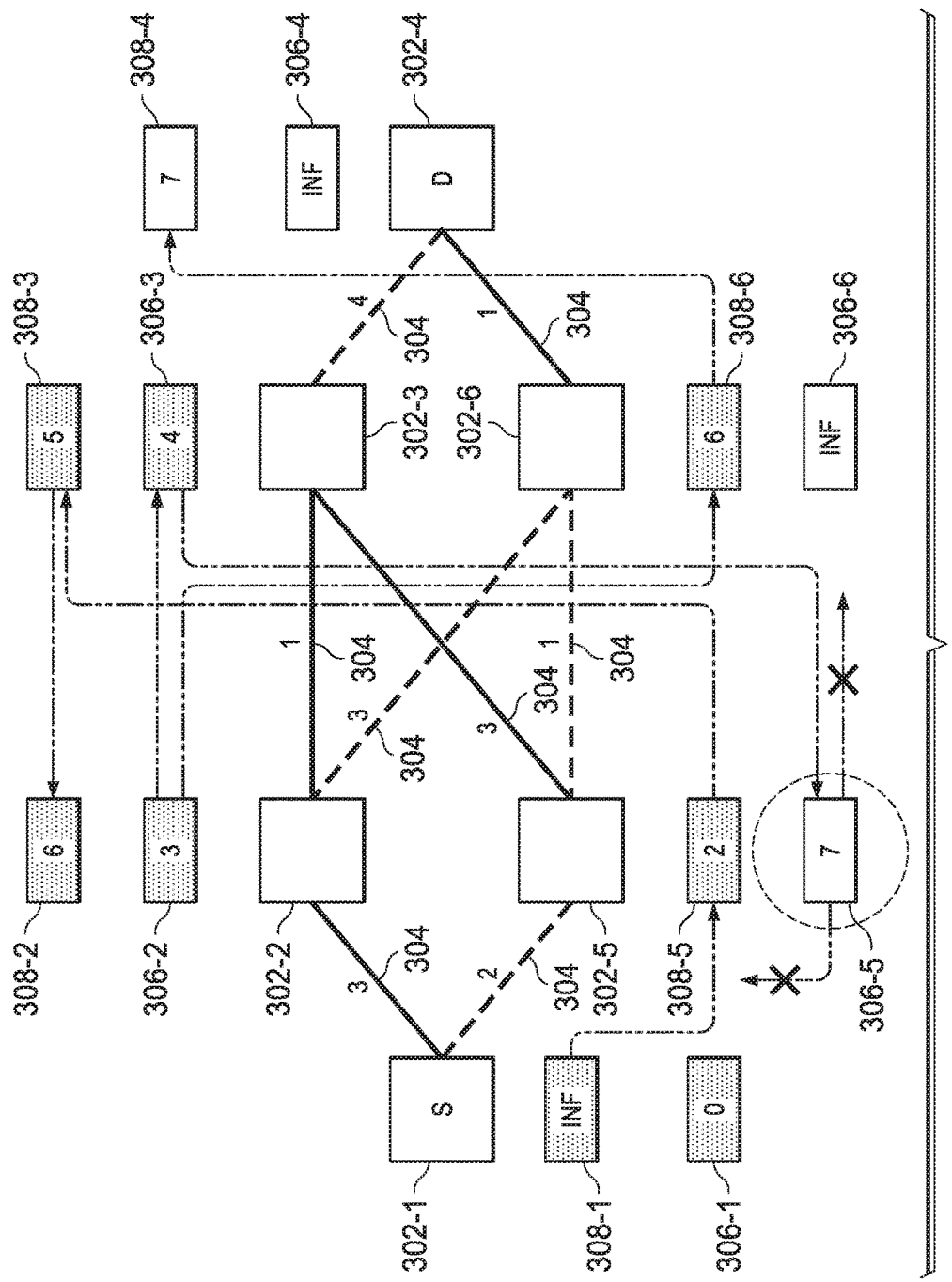

Virtual node 306-5 may be considered next because it has the smallest combined weight of the virtual nodes that have not been visited. In FIG. 3J, candidate virtual links from virtual node 306-5 are considered with neighboring virtual nodes. A link between virtual node 306-5 and virtual node 306-1 may be blocked because 306-1 has previously been marked as visited in FIG. 3C. Similarly, a link between virtual node 306-5 and virtual node 308-6 may be blocked because 308-6 has previously been marked as visited in FIG. 3I. After virtual nodes of neighbor nodes 302 have been considered, virtual node 306-5 may be marked as visited such that other virtual nodes may not link to it.

Figure 3K:
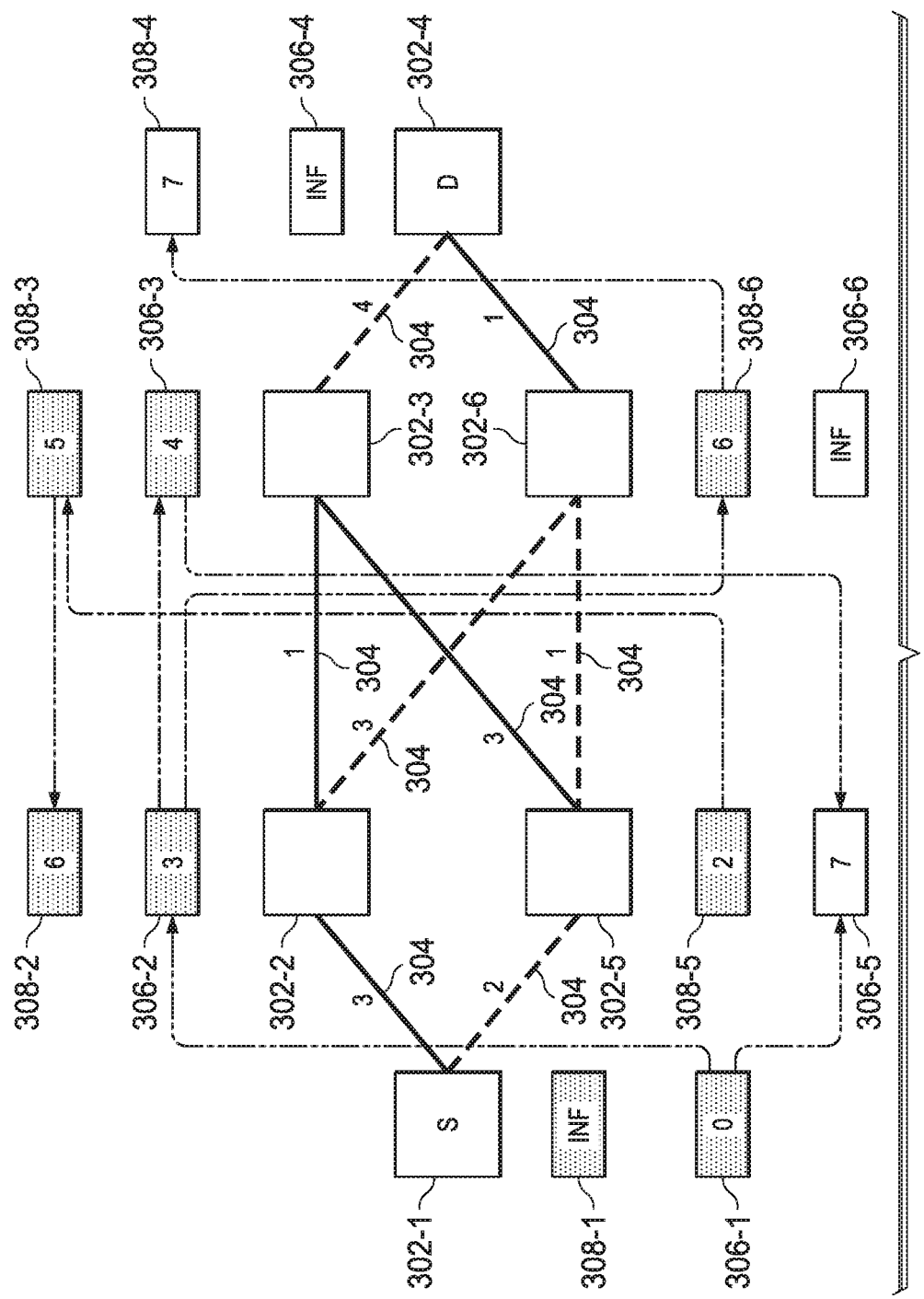

Virtual node 308-4 may be considered next because it has the smallest combined weight of the virtual nodes that have not been visited. In FIG. 3K, candidate virtual links from virtual node 308-4 are considered with neighboring virtual nodes. A link between virtual node 308-4 and virtual nodes of neighboring node 302-3 may be blocked because a second dashed physical link must be crossed (e.g., a violation of the constraint a path may have up to one dashed physical link) in traversing from node 302-4 to node 302-3. A link between virtual node 308-4 and virtual node 308-6 may be blocked because 308-6 has previously been marked as visited in FIG. 3I. After virtual nodes of neighbor nodes 302 have been considered, virtual node 306-5 may be marked as visited such that other virtual nodes may not link to it.

After FIG. 3K, the remaining virtual nodes that have not been marked as visited are virtual nodes 306-4 and 306-6. The combined weight at both of these virtual nodes is infinity, which means that there are no virtual links to these nodes, and therefore these virtual nodes are not reachable in network 300 with the constraint. That is, there is no path from source node 302-1 to node 302-6 or node 302-4 that passes zero dashed physical links.

Figure 3L:
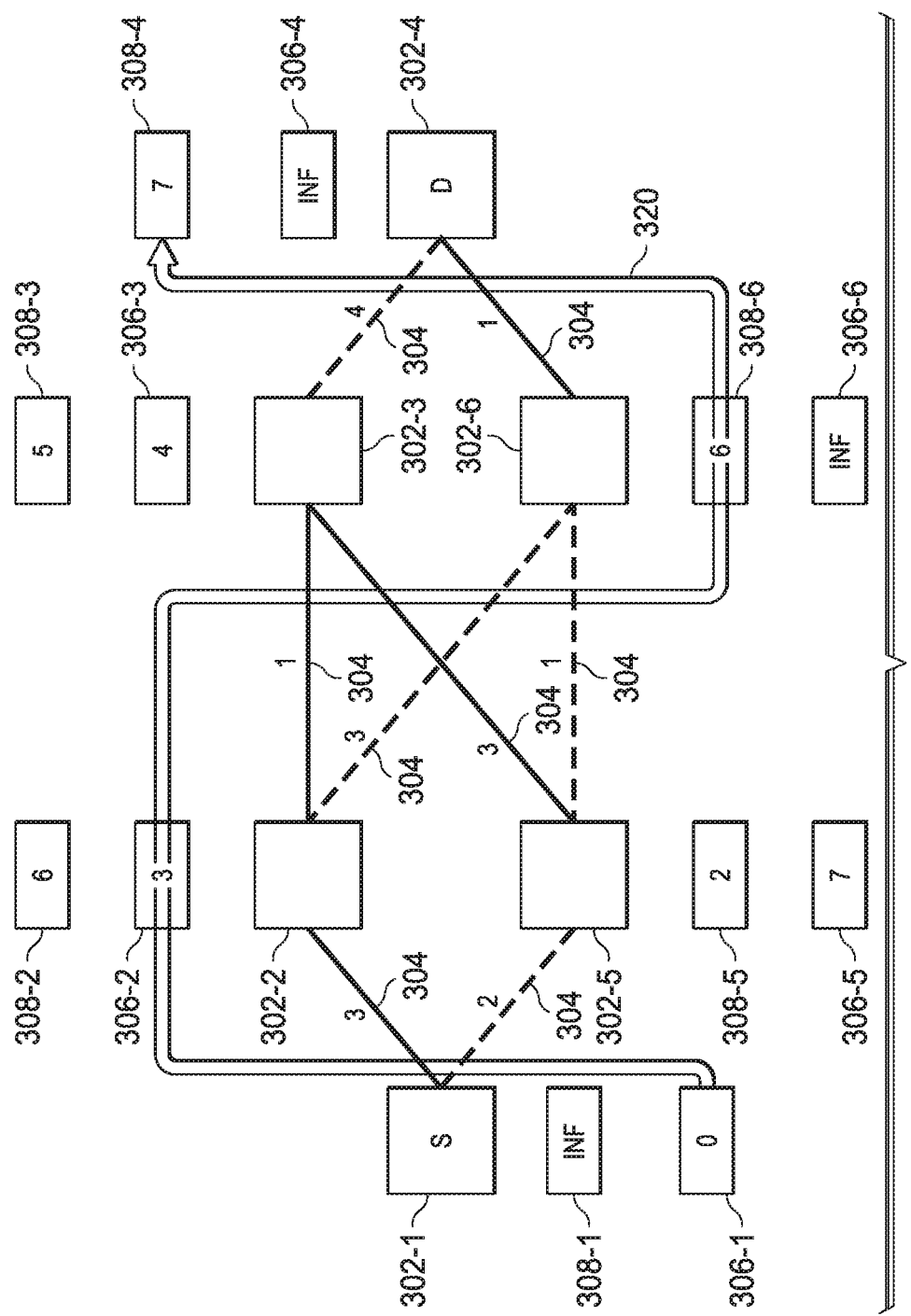

After all virtual nodes in network 300 are considered, the shortest distance from source node 302-1 to destination node 302-4 that does not violate the constraint (e.g., no more than one dashed physical link) may be determined from the virtual nodes at 302-4. Virtual node 306-4 has a combined weight of infinity, indicating that there is not a path from source node 302-1 to destination node 302-2 in network 300 that passes zero dashed physical links. Virtual node 308-4 has a combined weight of 7, representing the shortest distance from source node 302-1 to destination node 302-4 that does not violate the constraint. Shortest path 320 (e.g., the path between nodes 302-1→302-2→302-6→302-4) in FIG. 3L represents the shortest path from source node 302-1 to destination node 302-4 that does not violate the constraint. Determining the nodes in the shortest path may be tracked in any suitable manner. For example, the previous node from which a virtual link was created may be tracked during computation of the shortest path so that particular virtual nodes in the path may be determined by working back from the destination node to the source node.

While FIGS. 3A-3L illustrate an example shortest path algorithm operating in accordance with the present invention, the order and implementation described above are not intended to be limiting. The implementation above represents an implementation with Dijkstra's shortest path algorithm in which the above-explained modifications were made. However, the present invention may be implemented with similar modifications to another shortest path algorithm, including those discussed above with respect to FIG. 2. Also, in some embodiments, a constraint may limit the events (e.g., dashed links traversed) to more than one. For example, a constraint may limit a path to n number of events. In such an embodiment, a total of n+1 virtual nodes may be created for each node 302. Each virtual node may correspond with a number of permitted events (e.g., 0 to n).

As described above, network 300 may include a control system for determining the shortest path with a constraint. Similar to control system 200 in FIG. 2, executable instructions (i.e., executable code) may be executed by a processor to implement one or more features of the present invention. Although these instructions may take many forms, the following pseudo code represents exemplary instructions that may be run by a control system.

```
Shortest_Path_Search_With_Constraint (Graph, source)
  For each r // r = 0, 1, 2,...(max. number of occurrence under constraint)
    If r == number of occurrence at source node (e.g. zero recoloring at source node)
      dist[r][s][s] = 0 //distance from source to source
    Else
      dist[r][s][s] = INF //the number of occurrence is not matched at source ode
    End if
    prevNode[r][s][s] = UNDEFINED   // previous node initialization for source node
    prevNumOccurrence[r][s][v] = UNDEFINED // initialization of # of occurrence at source node, 0 or undefined
  End for
  For each r and each node v in Graph
    if v != s
      dist[r][s][v] = INF // unknown distance from source to destination, accumulated occurrence = r
      prevNode[r][s][s] = UNDEFINED // previous node is unknown
      prevNumOccurrence[r][s][v] = UNDEFINED // accumulated occurrence up to previous node is unknown
    end if
    add (r, v) to Q   //All nodes initially in Q with all possible allowed number of occurrence (unvisited nodes)
  End for
  While Q is not empty:
    remove (r,u) from Q
    For each neighbor of v of u //(but v is not previous node of (r,u) for better calculation efficiency)
      If v is previous node of (r,u) then continue For loop // prevent bouncing between two neighboring nodes
      r1 = r + number of occurrences of constraint between (u,v)
      If r1 > limit of number of occurrences   // Does it fail to satisfy the required constraint ?
        continue For
      End if
      dist1 = dist[r][s][u] + dist(u,v)
      If dist1 < dist[r1][s][v]            // check if it is the shorter distance and update info
        dist[r1][s][v] = dist 1
        prevNode [r1][s][v]=u
        prevNumOccurrence[r1][s][v]=r
      End If
    End For
  End While
  Return dist[ ][ ][ ], prevNode[ ][ ][ ], prevNumOccurrence[ ][ ][ ]
End of Shortest_Path_Search_With_Constraint
Retrieving_Shortest_Path_With_Constraint
  Shortest_dist_withConstraint = INF      //initialization
  For each r
    If dist[r][s][d] < Shortest_dist_withConstraint  //find minimum distance from s to d satisfying constraint
      Shortest_dist_withConstraint = dist[r][s][d]
      rd = r
    End If
  End For
  If Shortest_dist_withConstraint == INF
    inform "no solution is found"
    return
  End If
  tmpNode = d
  tmpR = rd
  While TmpNode != Undefined
    Add tmpNode to the first of pathList        //add the sequence of node from s to d to the path list
    tmpR = prevNumOccurrence[tmpR][s][tmpNode]
    tmpNode = prevNode [rd][s][tmpNode]
```

```
End While
End Retrieving_Shortest_Path_With_Constraint
```

Figure 4:
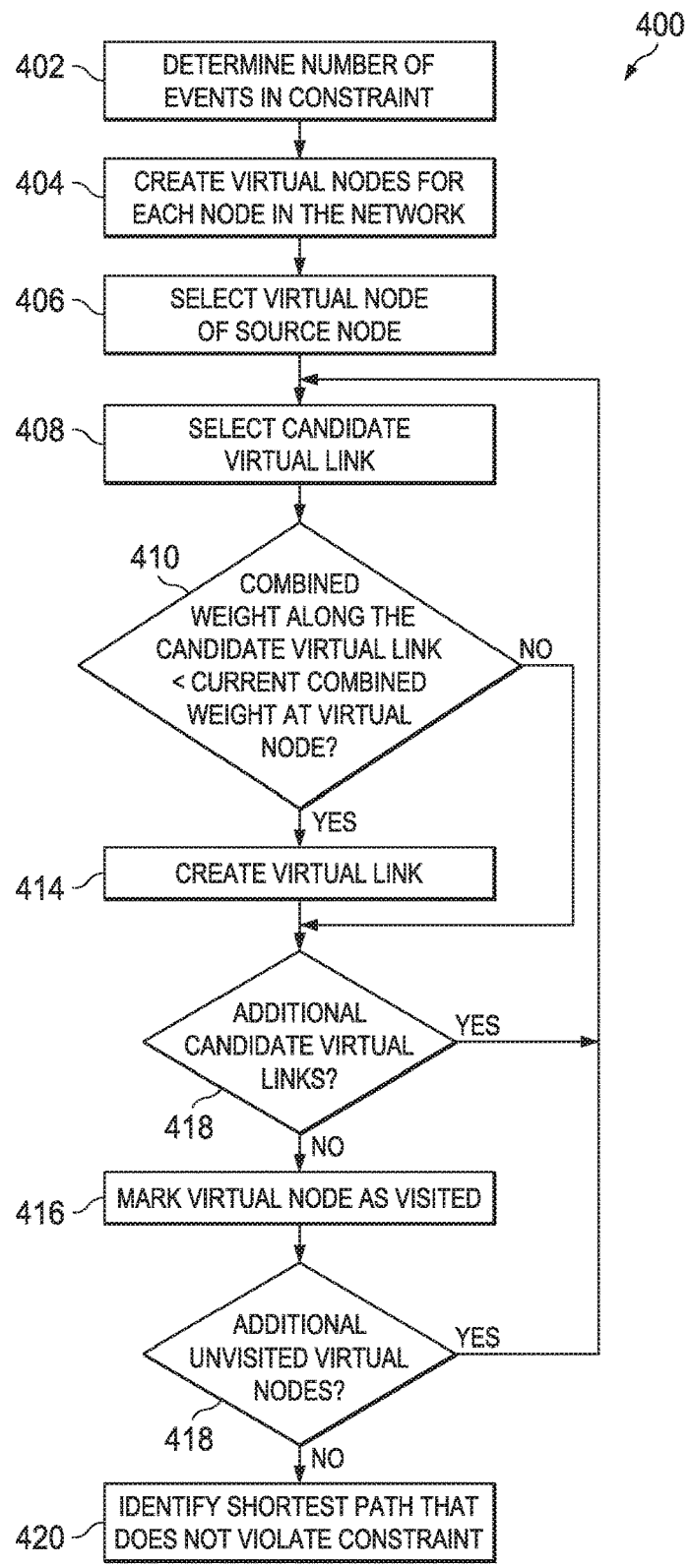
FIG. 4 is a flow chart of a method for determining the shortest path with a constraint in an optical network.

FIG. 4 is a flow chart of a method for determining the shortest path with a constraint in an optical network. Method 400 may be performed using one or more of the elements of control system 200 described in FIG. 2, including path computation engine 202. It is noted that certain operations described in method 400 may be optional or may be rearranged in different embodiments.

Method 400 may begin, at step 402, by determining the number of events permitted by a constraint. As described above, a constraint may define a number of events permissible in a path between a source node and destination node in a network. An event may represent an occurrence in the path, such as passing through a network node, passing through a physical link, and/or performing some type of signal processing (e.g., regeneration and/or recoloring). A constraint represents a maximum number of particular events in a network path. For example, in some embodiments, a constraint may limit the number of regenerations and/or recolorings that may occur in a path to reduce cost, delay, noise, transmission characteristics, and/or a combination thereof.

At step 404, virtual nodes are created for each node in the network. When a constraint permits n total events in a network path, n+1 virtual nodes may be created for each node in the network. Each virtual node may correspond with a number of permitted events (e.g., 0 to n).

At step 406, a virtual node of the source node is selected for processing. In some embodiments, the first node traversed may be the virtual node corresponding with zero permitted events.

At step 408, a candidate virtual link to neighboring virtual nodes is selected for consideration. The candidate virtual link represents a virtual link that could be created from the current virtual node to a neighboring virtual node without violating the constraint. For example, a virtual node corresponding with x occurrences of the event may link to a virtual node of a neighboring node corresponding with x or x+y occurrences, where y represents the number of events that exist or occur between nodes corresponding to the virtual nodes.

Next, a determination may be made at step 410 as to whether the combined weight along the candidate virtual link is less than the current combined weight at the virtual node to which the candidate virtual link would connect. For example, the weight of the candidate virtual link may be added to the combined weight of the virtual node from which the candidate virtual link would be created from (e.g., virtual node A). When the calculated weight is less than the combined weight presently at virtual node to which the candidate virtual link would be created (e.g., virtual node B), then this may represent a shorter path to virtual node B than any previous virtual link to virtual node B. When the result of step 410 is NO (e.g., the combined weight along the candidate virtual link is greater than the current combined weight at the virtual node to which the candidate virtual link would connect), then method 400 may proceed to step 414. In such a scenario, the candidate virtual link may not represent a shorter path to virtual node B. However, when the result of step 410 is YES (e.g., the combined weight along the candidate virtual link is less than the current combined weight at the virtual node to which the candidate virtual link would connect), then method 400 may proceed to step 412 in which a virtual link is created. In such a scenario, the candidate virtual link may represent a shorter path to virtual node B.

Next, a determination may be made at step 414 as to whether there are additional candidate virtual links for consideration. If there are additional candidate virtual links for consideration, then method 400 may proceed back to step 408 in which a new candidate virtual link is selected for processing. If, however, there are no additional candidate virtual links for consideration, then method 400 may proceed to step 416.

At step 416, the virtual node being processed may be marked as visited. Marking a virtual node as visited may prevent other virtual nodes from considering candidate virtual links to this node. In such embodiments, virtual links to a visited virtual node may be blocked or not considered as candidate virtual links.

At step 418, a determination may be made as to whether there are unvisited virtual nodes in the network to be considered. If the result of operation 418 is YES, then method 400 may proceed back to step 408 to process the next virtual node. In some embodiments, the next virtual node traversed may correspond to the unvisited virtual node with the lowest combined weight. If the result of step 418 is NO, then method 400 may proceed to step 420.

At step 420, the shortest path not violating the constraint is identified. In some embodiments, the shortest path may be identified by the virtual links between the virtual nodes. For example, the virtual node at the destination node with the lowest combined weight may correspond with the shortest path not violating the constraint. Thus, the virtual links between the virtual nodes may be traversed back to a virtual node at the source node to identify the shortest path. The shortest path may be through the network nodes corresponding with the path of virtual nodes. The path may represent the shortest path between a source node and a destination node that does not violate the constraint. For example, if the constraint limits the number of regenerations and/or recolorings that may occur in any path to n, then the shortest path with n or fewer regenerations and/or recolorings is identified. The shortest path that does not violate the constraint may be represented by the path to the virtual node at the destination node with the lowest combined weight. The identified path may be used for communication between the source and destination nodes. For example, the network control system may provision a communication channel between the source and destination node along the identified path such that traffic between these nodes is directed along the various nodes in the path.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for determining a shortest path with a constraint in an optical network, the method comprising:
   identifying a permitted number of events defined by the constraint;
   creating virtual nodes for each node in the optical network, the virtual nodes corresponding with the permitted number of events; and
   traversing the virtual nodes from a source node to a destination node with a shortest path algorithm, wherein traversing the virtual nodes comprises:
      creating virtual links between the virtual nodes when the constraint is not violated, the virtual link corresponding with a physical link;
      marking a virtual node as visited after the virtual node is traversed;
      blocking a virtual link to the virtual node after it is marked as visited; and
      identifying a shortest path between the source node and the destination node from the virtual links, the shortest path not violating the constraint.

2. The method of claim 1, wherein the shortest path algorithm is Dijkstra's algorithm.

3. The method of claim 1, wherein the constraint limits a number of optical signal recolorings.

4. The method of claim 1, wherein the constraint limits a number of optical signal regenerations.

5. The method of claim 1, wherein traversing the nodes further comprises blocking virtual links between the virtual nodes when the constraint is violated.

6. The method of claim 1, wherein each virtual link has a weight equal to a weight of the physical link between the corresponding nodes.

7. A method for determining a shortest path with a constraint in an optical network, the method comprising:
   identifying a permitted number of events defined by the constraint;
   creating virtual nodes for each node in the optical network, the virtual nodes corresponding with the permitted number of events; and
   traversing the virtual nodes from a source node to a destination node with a shortest path algorithm, wherein traversing the virtual nodes comprises:
      creating virtual links between the virtual nodes when the constraint is not violated, the virtual link corresponding with a physical link; and
      identifying a shortest path between the source node and the destination node from the virtual links, the shortest path not violating the constraint, wherein creating virtual links between the virtual nodes comprises:
      identifying a candidate virtual link between a virtual node and a neighboring virtual node, the neighboring virtual node corresponding with a number of events to reach the neighboring virtual node from the virtual node; and
      creating a virtual link from the candidate virtual link when a combined weight for the neighboring virtual node is more than a combined weight to the neighboring virtual node through the virtual node.

8. The method of claim 7, wherein creating virtual links between the virtual nodes further comprises disregarding the virtual link from the candidate virtual link when the combined weight for the neighboring virtual node is less than the combined weight to the neighboring virtual node through the virtual node.

9. A method for determining a shortest path with a constraint in an optical network, the method comprising:
   identifying a permitted number of events defined by the constraint;
   creating virtual nodes for each node in the optical network, the virtual nodes corresponding with the permitted number of events; and
   traversing the virtual nodes from a source node to a destination node with a shortest path algorithm, wherein traversing the virtual nodes comprises:
      creating virtual links between the virtual nodes when the constraint is not violated, the virtual link corresponding with a physical link; and
      identifying a shortest path between the source node and the destination node from the virtual links, the shortest path not violating the constraint, wherein identifying the shortest path comprises:
      identifying a virtual node of the destination node with a lowest combined weight, the lowest combined weight representing a sum of weights of the physical links in the shortest path; and
      following the virtual links from the virtual node with the lowest combined weight to the source node.

10. The method of claim 9, wherein the constraint limits a number of optical signal recolorings.

11. A control system for identifying the shortest path with a constraint, the control system comprising a processor having access to memory media storing instructions executable by the processor to:
   identify a permitted number of events defined by the constraint;
   create virtual nodes for each node in the optical network, the virtual nodes corresponding with the permitted number of events;
   traverse the virtual nodes from a source node to a destination node with a shortest path algorithm by creating virtual links between the virtual nodes when the constraint is not violated, the virtual link corresponding with a physical link;
   mark a virtual node as visited after the virtual node is traversed;
   block a virtual link to the virtual node after it is marked as visited; and
   identify a shortest path between the source node and the destination node from the virtual links, the shortest path not violating the constraint.

12. The control system of claim 11, wherein the shortest path algorithm is Dijkstra's algorithm.

13. The control system of claim 11, wherein the constraint limits a number of optical signal recolorings.

14. The control system of claim 11, wherein the constraint limits a number of optical signal regenerations.

15. The control system of claim 11, wherein the memory media further comprises instructions to block virtual links between the virtual nodes when the constraint is violated.

16. The control system of claim 11, wherein each virtual link has a weight equal to a weight of the physical link between the corresponding nodes.

17. A control system for identifying the shortest path with a constraint, the control system comprising a processor having access to memory media storing instructions executable by the processor to:
   identify a permitted number of events defined by the constraint;
   create virtual nodes for each node in the optical network, the virtual nodes corresponding with the permitted number of events;
   traverse the virtual nodes from a source node to a destination node with a shortest path algorithm by creating virtual links between the virtual nodes when the constraint is not violated, the virtual link corresponding with a physical link and identifying a shortest path between the source node and the destination node from the virtual links, the shortest path not violating the constraint, wherein creating virtual links between the virtual nodes comprises:

identifying a candidate virtual link between a virtual node and a neighboring virtual node, the neighboring virtual node corresponding with a number of events to reach the neighboring virtual node from the virtual node; and creating a virtual link from the candidate virtual link when a combined weight for the neighboring virtual node is more than a combined weight to the neighboring virtual node through the virtual node.

18. The control system of claim 17, wherein creating virtual links between the virtual nodes further comprises disregarding the virtual link from the candidate virtual link when the combined weight for the neighboring virtual node is less than the combined weight to the neighboring virtual node through the virtual node.

19. A control system for identifying the shortest path with a constraint, the control system comprising a processor having access to memory media storing instructions executable by the processor to:

identify a permitted number of events defined by the constraint;

create virtual nodes for each node in the optical network, the virtual nodes corresponding with the permitted number of events;

traverse the virtual nodes from a source node to a destination node with a shortest path algorithm by creating virtual links between the virtual nodes when the constraint is not violated, the virtual link corresponding with a physical link and identifying a shortest path between the source node and the destination node from the virtual links, the shortest path not violating the constraint, wherein identifying the shortest path comprises:

identifying a virtual node of the destination node with a lowest combined weight; and following the virtual links from the virtual node with the lowest combined weight to the source node.

20. The control system of claim 19, wherein the constraint limits a number of optical signal recolorings.

* * * * *